(12) United States Patent
Feng et al.

(10) Patent No.: US 12,106,547 B2
(45) Date of Patent: Oct. 1, 2024

(54) METHOD AND SYSTEM FOR SCREENING SPECTRAL INDEXES OF RICE RESISTANT TO BACTERIAL BLIGHT

(71) Applicant: Zhejiang University, Hangzhou (CN)

(72) Inventors: Xuping Feng, Hangzhou (CN); Yong He, Hangzhou (CN); Jinnuo Zhang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 386 days.

(21) Appl. No.: 17/575,791

(22) Filed: Jan. 14, 2022

(65) Prior Publication Data
US 2023/0095405 A1    Mar. 30, 2023

(30) Foreign Application Priority Data
Sep. 30, 2021   (CN) .......................... 202111157675.3

(51) Int. Cl.
G06V 10/77    (2022.01)
G06T 7/00     (2017.01)
(Continued)

(52) U.S. Cl.
CPC ........ G06V 10/7715 (2022.01); G06T 7/0012 (2013.01); G06T 7/136 (2017.01);
(Continued)

(58) Field of Classification Search
CPC ...... G06V 10/82; G06V 10/58; G06V 20/188; G06V 20/69; G06V 10/56; G06V 20/698;
(Continued)

(56) References Cited

U.S. PATENT DOCUMENTS

| | | | |
|---|---|---|---|
| 2018/0259496 A1* | 9/2018 | McPeek | G01N 33/025 |
| 2019/0219499 A1* | 7/2019 | Gold | G01N 21/359 |

(Continued)

OTHER PUBLICATIONS

Zhang D, Wang Q, Lin F, Yin X, Gu C, Qiao H. Development and Evaluation of a New Spectral Disease Index to Detect Wheat Fusarium Head Blight Using Hyperspectral Imaging. Sensors (Basel). Apr. 16, 2020;20(8):2260. doi: 10.3390/s20082260. PMID: 32316216; PMCID: PMC7219049 (Year: 2020).*

(Continued)

*Primary Examiner* — Aaron W Carter
*Assistant Examiner* — Courtney Joan Nelson
(74) *Attorney, Agent, or Firm* — Troutman Pepper Hamilton Sanders LLP; Christopher C. Close, Jr.

(57) ABSTRACT

A method and system for screening spectral indexes of rice resistant to bacteria. The method includes: processing spectral data of a test sample by a threshold segmentation algorithm to obtain average spectral information of each spectral image and a proportion of lesions corresponding to each spectral image; training a deep learning algorithm model based on a self-attention mechanism by using the average spectral information of each spectral image and the proportion of the corresponding lesions to construct a regression model for evaluating an area of the lesions; determining an optimal band combination and a weight value corresponding to each band in the optimal band combination based on the regression model for evaluating the area of the lesions, and then determining the spectral indexes; and identifying differences between rice of different genotypes at different times of infection by using the spectral indexes, and screening rice varieties resistant to bacterial blight.

6 Claims, 7 Drawing Sheets

(51) Int. Cl.
  *G06T 7/136* (2017.01)
  *G06V 10/26* (2022.01)
  *G06V 20/68* (2022.01)

(52) U.S. Cl.
  CPC .............. *G06V 10/26* (2022.01); *G06V 20/68* (2022.01); *G06T 2207/30096* (2013.01)

(58) Field of Classification Search
  CPC ...... G06V 10/26; G06V 20/68; G06V 20/194; G06V 10/25; G06V 10/7715; G06T 2207/30188; G06T 2207/20084; G06T 2207/10036; G06T 2207/30128; G06T 2207/30096; G06T 2207/20112; G06T 3/4046; G06T 7/136; G06T 7/0012; G06F 18/27; G06F 18/24; A01G 22/22; G01N 2021/8466; G01N 2201/1296; G01N 33/0098; G01N 21/359; G01N 2021/6421; G01N 2021/6419; G01N 21/25; G01N 21/95607; G01N 2800/26; G01N 2800/56
  See application file for complete search history.

(56) References Cited

U.S. PATENT DOCUMENTS

2020/0134358 A1* 4/2020 She ................ G06V 10/771
2020/0333185 A1* 10/2020 Vrabie ................ G06N 3/08

OTHER PUBLICATIONS

Zhou RQ, Jin JJ, Li QM, Su ZZ, Yu XJ, Tang Y, Luo SM, He Y, Li XL. Early Detection of Magnaporthe oryzae—Infected Barley Leaves and Lesion Visualization Based on Hyperspectral Imaging. Front Plant Sci. Jan. 15, 2019;9:1962. doi: 10.3389/fpls.2018.01962. PMID: 30697221; PMCID: PMC6341029 (Year: 2019).*

Anna O. Conrad, Wei Li, Da-Young Lee, Guo-Liang Wang, Luis Rodriguez-Saona, Pierluigi Bonello. Machine Learning-Based Presymptomatic Detection of Rice Sheath Blight Using Spectral Profiles. Plant Phenomics. 2020;2020: DOI: 10.34133/2020/8954085 (Year: 2020).*

Lin F, Guo S, Tan C, Zhou X, Zhang D. Identification of Rice Sheath Blight through Spectral Responses Using Hyperspectral Images. Sensors (Basel). Nov. 2, 2020;20(21):6243. doi: 10.3390/s20216243. PMID: 33147714; PMCID: PMC7663646 (Year: 2020).*

* cited by examiner

METHOD AND SYSTEM FOR SCREENING SPECTRAL INDEXES OF RICE RESISTANT TO BACTERIAL BLIGHT

CROSS REFERENCE TO RELATED APPLICATIONS

This patent application claims the benefit and priority under 35 U.S.C. § 119(e) of 202111157675.3 filed on 30 Sep. 2021, the disclosure of which is incorporated by reference herein in its entirety as part of the present application.

TECHNICAL FIELD

The present disclosure relates to the field of detection of rice resistant to bacterial blight, in particular to a method and system for screening spectral indexes of rice resistant to bacterial blight based on a self-attention model.

BACKGROUND ART

Bacterial blight of rice is a bacterial disease caused by infections of *Xanthomonas oryzae* pv. *oryzae*, and the optimal temperature for its development is 26-30° C. Bacterial blight of rice is one of the most serious and prevalent rice bacterial diseases in major rice producing countries. With the occurrence of bacterial blight in the field, destructive damage to the quantity and quality of rice is inevitable, resulting in huge economic losses and food safety issues.

Leaves of infected rice tend to wither developmentally at the edge and center, which leads to insufficient photosynthesis and reduced crop yields. Although the pesticide can reduce harmful effects, it pollutes the ecological environment. Therefore, in order to effectively manage and reduce the impact of diseases without damaging the environment, it is essential to select disease-resistant varieties. Researchers have been sparing no effort to mine undetected gene locations/markers related to resistance, cultivate new rice varieties, and explore genetic resistance mechanisms. The most intuitive and accurate method to verify or evaluate the resistance to bacterial blight of rice is to measure and compare the area or length of lesions after infection with the pathogen. However, screening hundreds of rice varieties requires huge labor costs and is low in efficiency. Obtaining rice leaf phenotypes accurately and rapidly, especially leaf lesions, will play an important auxiliary role in disease resistance breeding and mining rice leaf phenotype information. However, it is a time-consuming task to obtain a large number of time series leaf lesion phenotypes accurately.

Due to the non-destructive and informative characteristics of visible/near-infrared spectrum, promising research results and methods have been obtained in the acquisition of plant phenotypes. By establishing discriminative models and regression models based on continuous and narrow hyperspectral data, different plant diseases are identified and quantified. Furlanetto et al. developed a method for detecting soybean rust based on spectral analysis, and the verification accuracy of severity classification reached 82.51%. Feng et al. studied the fusion of multi-source spectral data for early detection of the rice leaf disease, and the final comparison results showed that the discriminative model based on visible light/near-infrared spectrum is optimal. However, from a practical point of view, the redundancy in the multi-spectral band limits rapid and low-cost applications.

SUMMARY

The objective of the present disclosure is to provide a method and system for screening spectral indexes of rice resistant to bacterial blight based on a self-attention model, which solves the problem of establishing redundancy of spectral features of rice leaves of different genotypes, and realizes rapid and effective identification of rice resistant to bacterial blight.

To implement the above objective, the present disclosure provides the following solutions:

A method for screening spectral indexes of rice resistant to bacterial blight includes:
  obtaining spectral data of a test sample, where the test sample is rice leaves of different genotypes at different times of infection, and the spectral data includes multiple spectral images;
  processing the spectral data by a threshold segmentation algorithm to obtain average spectral information of each spectral image and a proportion of lesions corresponding to each spectral image;
  training a deep learning algorithm model based on a self-attention mechanism by using the average spectral information of each spectral image and the proportion of the lesions corresponding to each spectral image to construct a regression model for evaluating an area of the lesions;
  determining an optimal band combination and a weight value corresponding to each band in the optimal band combination based on the regression model for evaluating the area of the lesions; and
  determining the spectral indexes based on the optimal band combination and the weight value corresponding to each band in the optimal band combination.

Optionally, a process of obtaining the spectral data of the test sample may specifically include:
  arranging the rice leaves of different genotypes at different times of infection neatly on a black plate, and then placing the black plate on a conveyor belt; and
  photographing the rice leaves on the conveyor belt by a spectral imaging system to obtain the spectral data of the test sample.

Optionally, a process of processing the spectral data by the threshold segmentation algorithm to obtain the average spectral information of each spectral image and the proportion of the lesions corresponding to each spectral image may specifically include:
  determining a segmentation threshold;
  processing the spectral data by using the segmentation threshold to obtain a lesion area and a leaf area of each spectral image; and
  respectively calculating the number of pixels in the lesion area and the number of pixels in the leaf area in each spectral image to obtain the average spectral information of each spectral image and the proportion of the lesions corresponding to each spectral image.

Optionally, the segmentation threshold may be a maximum difference value of spectral reflectance of the lesion area and the leaf area at a wavelength of 778.68 nm.

Optionally, a process of determining the optimal band combination and the weight value corresponding to each band in the optimal band combination based on the regression model for evaluating the area of the lesions may specifically include:
  extracting self-attention features based on the regression model for evaluating the area of the lesions;

sorting the self-attention features according to a rule from large to small, selecting bands of the first N self-attention feature pairs, and determining the optimal band combination based on the bands of the first N self-attention feature pairs; and determining the weight value corresponding to each band in the optimal band combination based on the regression model for evaluating the area of the lesions.

Optionally, the method may further include:

identifying differences between rice of different genotypes at different times of infection by using the spectral indexes, and screening rice varieties resistant to bacterial blight.

A system for screening spectral indexes of rice resistant to bacterial blight includes:

a data obtaining module, configured to obtain spectral data of a test sample, where the test sample is rice leaves of different genotypes at different times of infection, and the spectral data includes multiple spectral images;

an information determination module, configured to process the spectral data by a threshold segmentation algorithm to obtain average spectral information of each spectral image and a proportion of lesions corresponding to each spectral image;

a model construction module, configured to train a deep learning algorithm model based on a self-attention mechanism by using the average spectral information of each spectral image and the proportion of the lesions corresponding to each spectral image to construct a regression model for evaluating an area of the lesions;

a band information determination module, configured to determine an optimal band combination and a weight value corresponding to each band in the optimal band combination based on the regression model for evaluating the area of the lesions; and a spectral index determination module, configured to determine the spectral indexes based on the optimal band combination and the weight value corresponding to each band in the optimal band combination.

Optionally, the information determination module may specifically include:

a segmentation threshold determination unit, configured to determine a segmentation threshold, where the segmentation threshold may be a maximum difference value of spectral reflectance of a lesion area and a leaf area at a wavelength of 778.68 nm;

an area division unit, configured to process the spectral data by using the segmentation threshold to obtain the lesion area and the leaf area of each spectral image; and an information determination unit, configured to respectively calculate the number of pixels in the lesion area and the number of pixels in the leaf area in each spectral image to obtain the average spectral information of each spectral image and the proportion of the lesions corresponding to each spectral image.

Optionally, the band information determination module may specifically include:

a self-attention feature extraction unit, configured to extract self-attention features based on the regression model for evaluating the area of the lesions;

an optimal band combination determination unit, configured to sort the self-attention features according to a rule from large to small, select bands of the first N self-attention feature pairs, and determine the optimal band combination based on the bands of the first N self-attention feature pairs; and a weight value determination unit, configured to determine the weight value corresponding to each band in the optimal band combination based on the regression model for evaluating the area of the lesions.

Optionally, the system may further include:

a screening module, configured to identify differences between rice of different genotypes at different times of infection by using the spectral indexes, and screen rice varieties resistant to bacterial blight.

Based on specific examples provided in the present disclosure, the present disclosure discloses the following technical effects:

(1) The effect is excellent. The resistance of rice is quantified by the digital method, which is helpful to accelerate the breeding process. (2) The method is simple and saves the detection cost, and is suitable for high-throughput detection of rice resistance phenotypes.

BRIEF DESCRIPTION OF THE DRAWINGS

To describe the technical solutions in examples of the present disclosure or in the prior art more clearly, the accompanying drawings required in the examples will be briefly described below. Apparently, the accompanying drawings in the following description show merely some examples of the present disclosure, and other drawings can be derived from these accompanying drawings by those of ordinary skill in the art without creative efforts.

DETAILED DESCRIPTION OF THE EMBODIMENTS

The technical solutions of the examples of the present disclosure are clearly and completely described below with reference to the accompanying drawings. Apparently, the described examples are merely a part rather than all of the examples of the present disclosure. All other examples obtained by those of ordinary skill in the art on the basis of the examples of the present disclosure without creative efforts shall fall within the protection scope of the present disclosure.

Calculating a concise vegetation index by retaining some key information of the spectrum will more effectively promote the progress of plant disease research. In order to greatly mine potential spectral features and retain key spectral bands, the deep learning algorithm known for its powerful feature extraction capability is bound to play a role. In view of this, the present disclosure provides a method and system for screening spectral indexes of rice resistant to bacterial blight based on a self-attention model, which solves the problem of establishing redundancy of spectral features of rice leaves of different genotypes, and realizes rapid and effective identification of rice resistant to bacterial blight.

Example I

Figure 1:
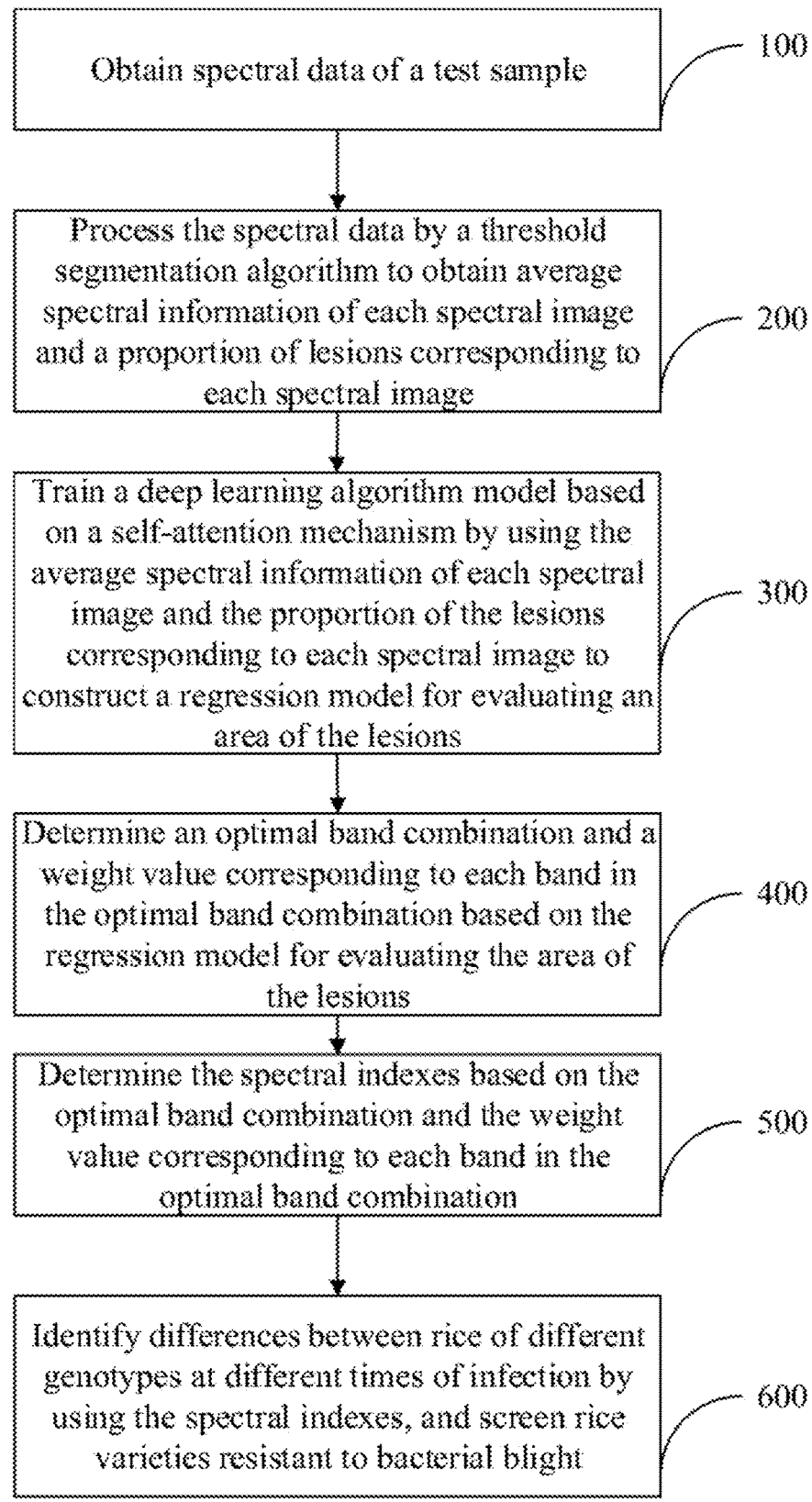
FIG. 1 is a schematic flow diagram of a method for screening spectral indexes of rice resistant to bacterial blight of the present disclosure.

The present example provides a method for screening spectral indexes of rice resistant to bacterial blight based on a self-attention model. As shown in FIG. 1, the method included the following steps.

Step 100: spectral data of a test sample was obtained. The test sample was rice leaves of different genotypes at different times of infection. The spectral data included multiple spectral images. A process specifically included the following steps.

The rice leaves of different genotypes at different times of infection were arranged neatly on a black plate, and then the black plate was placed on a conveyor belt. The rice leaves on the conveyor belt were photographed by a spectral imaging system built in the laboratory to acquire the spectral data of the test sample. The height of the acquired spectral image was 29 cm, the running speed of the conveyor belt was 2.2 mm/s, the exposure time of a spectral camera was set to 45 ms, and the light intensity was 135 lx.

Step 200: the spectral data was processed by a threshold segmentation algorithm to obtain average spectral information of each spectral image and a proportion of lesions corresponding to each spectral image. A process specifically included the following steps.

A segmentation threshold was determined. The segmentation threshold was a maximum difference value of spectral reflectance of a lesion area and a leaf area at a wavelength of 778.68 nm, that is, 0.11.

The spectral data was processed by using the segmentation threshold to obtain the lesion area and the leaf area of each spectral image.

The number of pixels in the lesion area and the number of pixels in the leaf area in each spectral image were respectively calculated to obtain the average spectral information of each spectral image and the proportion of the lesions corresponding to each spectral image.

Step 300: a deep learning algorithm model based on a self-attention mechanism was trained by using the average spectral information of each spectral image and the proportion of the lesions corresponding to each spectral image to construct a regression model for evaluating an area of the lesions.

Through a self-built attention block, the importance of the spectral band input by the model was autonomously learned, highlighting the feature bands that were highly related to the proportion of the lesions, without human intervention.

Step 400: an optimal band combination and a weight value corresponding to each band in the optimal band combination were determined based on the regression model for evaluating the area of the lesions. A process specifically included the following steps.

Self-attention features were extracted based on the regression model for evaluating the area of the lesions. The self-attention features were sorted according to a rule from large to small, bands of the first N self-attention feature pairs were selected, and the optimal band combination was determined based on the bands of the first N self-attention feature pairs. The weight value corresponding to each band in the optimal band combination was determined based on the regression model for evaluating the area of the lesions.

Step 500: the spectral indexes were determined based on the optimal band combination and the weight value corresponding to each band in the optimal band combination.

For example, when the number of feature screening was set to 4, the corresponding band and weight were extracted according to the feature value to establish a new spectral index LP. The spectral feature bands were 488 nm, 495 nm, 682 nm, and 683 nm, and the calculated weights corresponding to the spectral feature bands were 0.8, −0.65, 1, and −0.9. A calculation formula was:

$$I_{LP}=0.8R_{488}-0.65R_{495}+R_{682}-0.9R_{683}$$

Step 600: differences between rice of different genotypes at different times of infection were identified by using the spectral indexes, and rice varieties resistant to bacterial blight were screened.

When the bacterial blight was inoculated for 15 days, the accuracy of screening resistant rice varieties using this spectral index LP was high. On the 43rd day after inoculation, the accuracy of to evaluating the resistance of different resistant rice using this spectral index was high.

Samples in the present example were rice leaves of rice resistant variety 3A26, rice resistant variety 4A37, and susceptible variety IR24 provided by Zhejiang Academy of Agricultural Sciences. Spectral images of the rice leaves at 3, 9, 15, 20, 28, 33, 38, and 43 days after inoculation with the bacterial blight were acquired. During model training, the samples were divided into a training set and a prediction set according to the ratio of 7:3, and there were a total of 306 rice leaf samples.

The proportion of the lesions in rice leaves of different varieties at different times of infection was predicted by the regression model for evaluating the area of the lesions. The results showed that the predictive regression coefficient of determination reached 0.9910, and the ratio of the standard deviation of the verification set to the standard error of the prediction reached 15.6338. Satisfactory prediction accuracy was obtained. At the same time, the spectral index $I_{LP}$ was obtained by extracting the corresponding weight of the attention band. In the correlation analysis with the proportion of the lesions, a correlation coefficient of 0.9605 was obtained, which was obviously better than the traditional vegetation index, indicating that the spectral index $I_{LP}$ of the present disclosure can effectively represent the development of the proportion of the lesions. Through variance analysis of the spectral indexes of different genotypes at different times of infection, the effectiveness of the identification of resistant varieties was verified, and a new index for identifying the level of resistance was provided.

Example II

The present disclosure provides a method for screening spectral indexes of rice resistant to bacterial blight based on a self-attention model. The method included the following steps: firstly, visible and near-infrared (400-1,000 nm) hyperspectral images of rice leaves of different genotypes were acquired. Secondly, an area of lesions and an area of leaves were obtained based on a threshold segmentation algorithm and visible and near-infrared (400-1,000 nm) hyperspectral images. Then, a proportion of lesions was calculated based on the area of the lesions and the area of the leaves. Then a quantitative regression model of the proportion of the lesions was established using a self-built deep learning algorithm model LPnet based on a self-attention mechanism. A self-attention mechanism module in the deep learning algorithm model extracted four feature wavelengths (488 nm, 495 nm, 682 nm, and 683 nm) and corresponding weight information (0.8, −0.65, 1, and −0.9) to form a new spectral index $I_{LP}$. Finally, based on the new spectral index $I_{LP}$, the conditions of rice of different genotypes at different times of infection were compared and analyzed, and resistant rice varieties and non-resistant rice varieties were distinguished at different times of infection. The present example provides a new method for establishing spectral indexes for high-throughput screening of rice varieties resistant to bacterial blight, which helps to reduce the labor pressure of breeders and realize intelligent management of breeding.

In the present example, three rice varieties (IR24, 3A26, and 4A37) with different resistance to the bacterial blight were selected as test varieties. The first rice variety IR24 was an excellent variety developed by the International Rice Research Institute, but it was highly sensitive to rice diseases. With the help of the molecular marker technology, two quantitative trait loci (QTL) resistant to the bacterial blight were introduced into the rice variety IR24, and two other rice varieties 3A26 and 4A37 resistant to the bacterial blight were constructed. Except that the rice varieties IR24, 3A26, and 4A37 had the same genetic basis, the rice varieties 3A26 and 4A37 contained resistance QTLs, which were located on chromosomes 5 and 3 respectively. All rice samples were provided by a breeding base of State Key Laboratory Breeding Base for Zhejiang Sustainable Pest and Disease Control (Hangzhou).

In general, the visible and near-infrared hyperspectral images of 306 rice leaves (the rice leaves were rice leaves within 2 months under different times of infection and different conditions of infection) were acquired in the test field of Zhejiang Academy of Agricultural Sciences. The rice was separated according to the designed plots, and adequate water, nutrition, and pest management were carried out to make it free of other stress factors. The present example will be further described in detail with reference to the accompanying drawings.

(1) Analysis of Regression Model of Proportion of Lesions

Figure 2:
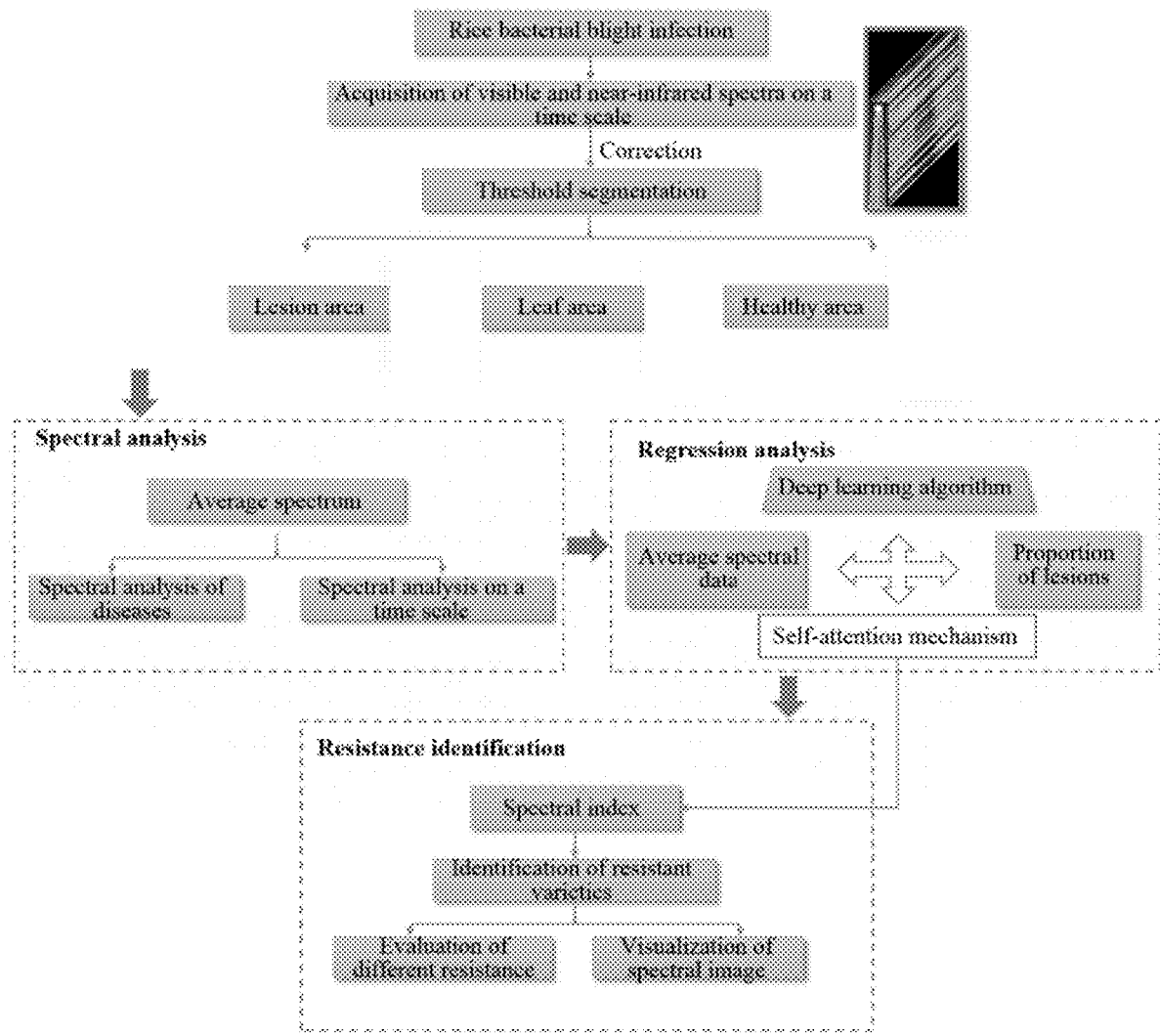
FIG. 2 is an overall block diagram of the method for screening spectral indexes of rice resistant to bacterial blight of the present disclosure.
Figure 3:
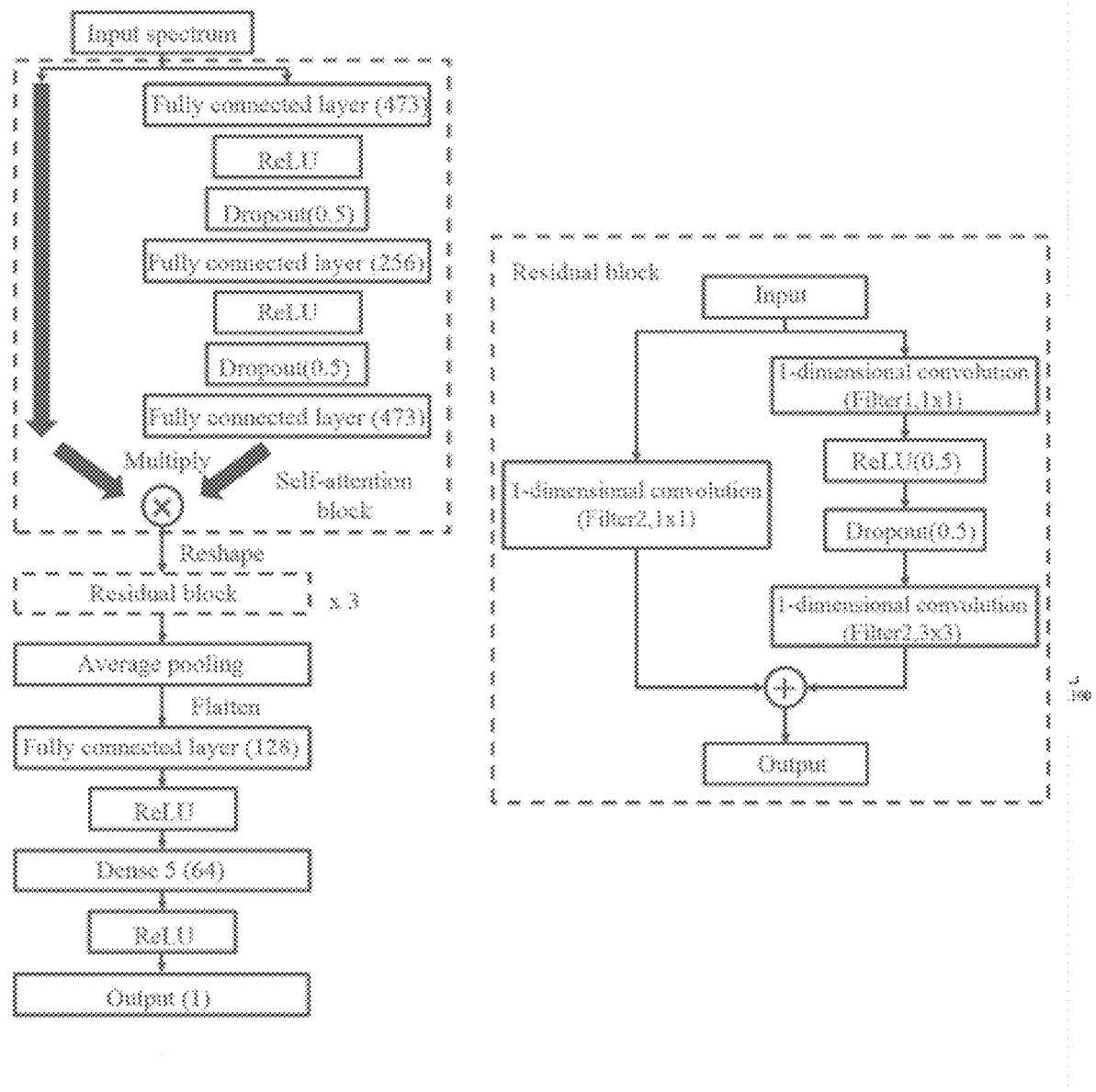
FIG. 3 is a framework diagram of a deep learning model based on a self-attention mechanism of the present disclosure.

The overall framework of the method provided in the present example is shown in FIG. 2, rice leaves of different genotypes at different times of infection were arranged on a flat black bottom plate, and there were a total of 306 samples. A spectral image of each sample was obtained through a hyperspectral imager. The above spectral image was processed based on the threshold segmentation algorithm to obtain the spectral image of a lesion area and a leaf area, and then the average spectrum and the proportion of the lesions were calculated. The samples were divided into a training set and a prediction set according to the ratio of 7:3. All the average spectra in the training set were sent to the deep learning model LPnet (FIG. 3) based on the self-attention mechanism for regression prediction of the proportion of the lesions to obtain the regression model for evaluating the area of the lesions. The regression model for evaluating the area of the lesions was tested with a test set, and it was found that the coefficient of determination reached 0.9910, which had good regression performance. More importantly, considering an offset distance between the training set and the test set, no overfitting occurred, which strongly proved that the predictive ability of the regression model for evaluating the area of the lesions was stable. The established regression model for evaluating the area of the lesions was guaranteed, and the PRD value was 15.6338. From the regression results of the proportion of the lesions, it was reliable to mine hidden features in the leaf spectrum of diseases by the regression model for evaluating the area of the lesions.

(2) Obtaining of Spectral Index of Proportion of Lesions

Figure 4:
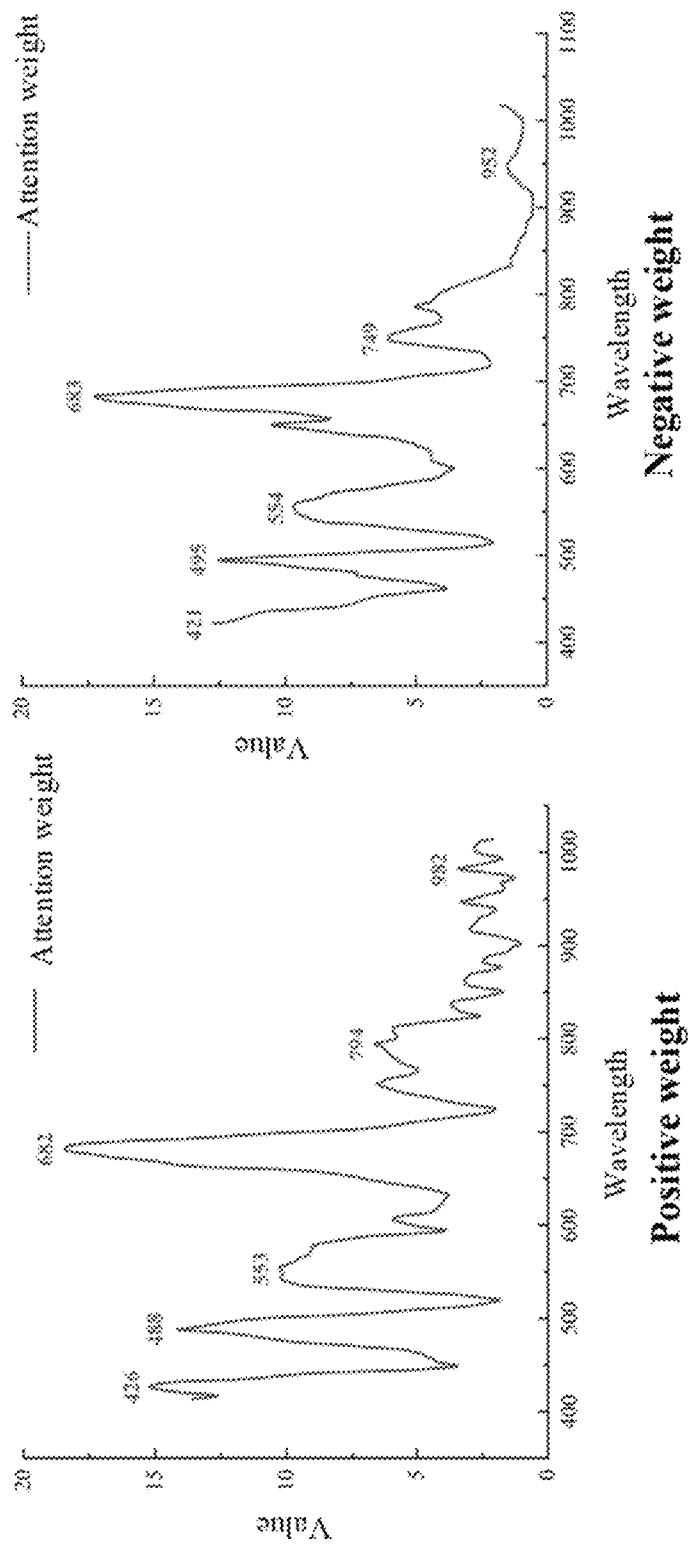
FIG. 4 is a distribution diagram of the spectral indexes of the present disclosure.

In the regression model for evaluating the area of the lesions, the value of each band of the spectrum was multiplied by a weight of autonomous learning to form an attention mechanism. In the parameter extraction process of the regression model for evaluating the area of the lesions, the weights corresponding to different bands were obtained. In order to make better use of the weight value, a weight curve was subjected to mean filtering and absolute value processing (FIG. 4). According to the selection of weighted peak sorting and band coverage, the optimal band combination and the corresponding weight value were determined, and then the spectral index $I_{LP}$ was determined. Compared with the common vegetation index, it was found that the spectral index $I_{LP}$ could better establish the relationship with the proportion of the lesions, and the correlation coefficient reached 0.9605, which proved the effectiveness of the spectral index.

A calculation formula of the spectral index was:

$$I_{LP}=0.8R_{488}-0.65R_{495}+R_{682}-0.9R_{683}$$

(3) Visualization of Spectral Index of Proportion of Lesions

Figure 5:
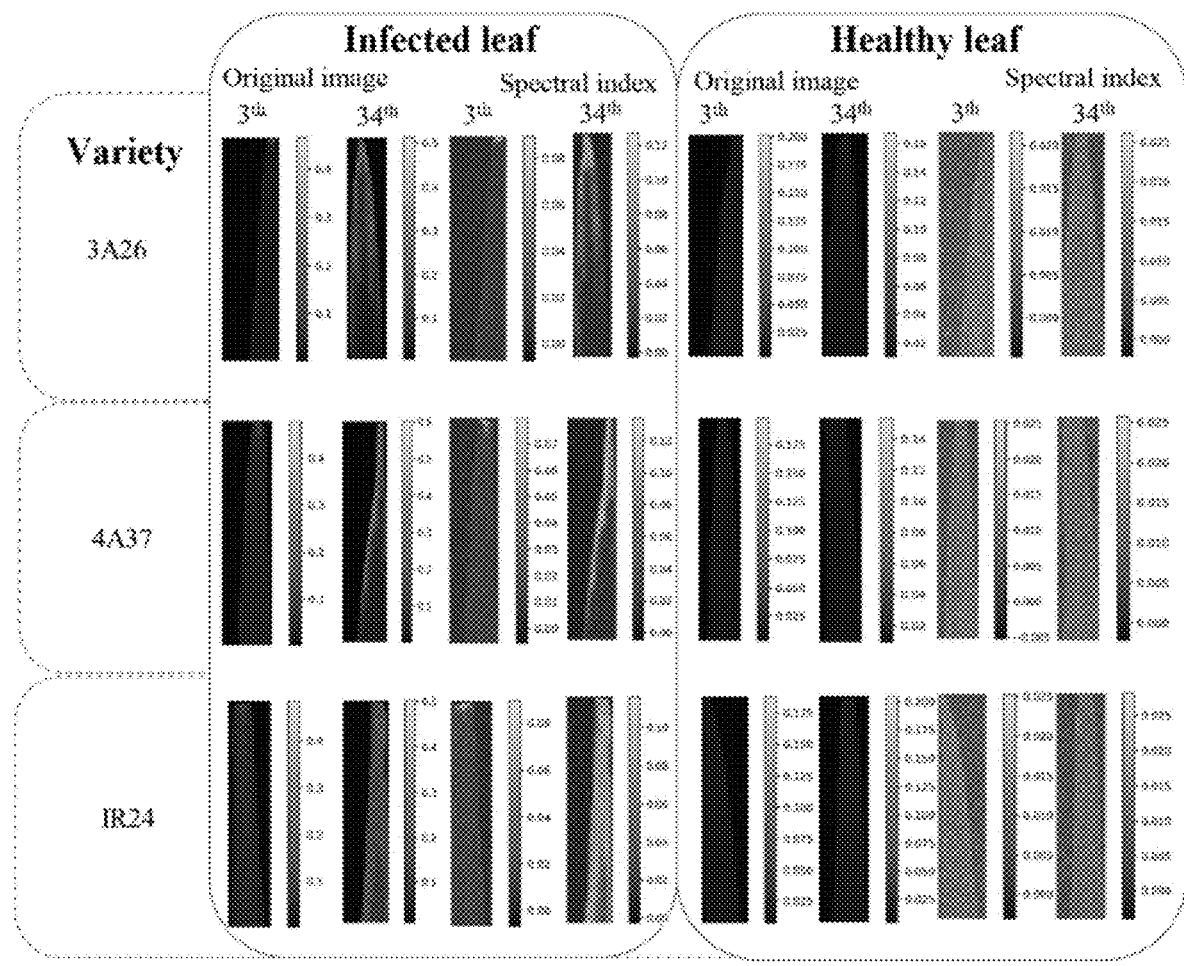
FIG. 5 is a visualization diagram of the spectral indexes of the present disclosure.
Figure 6:
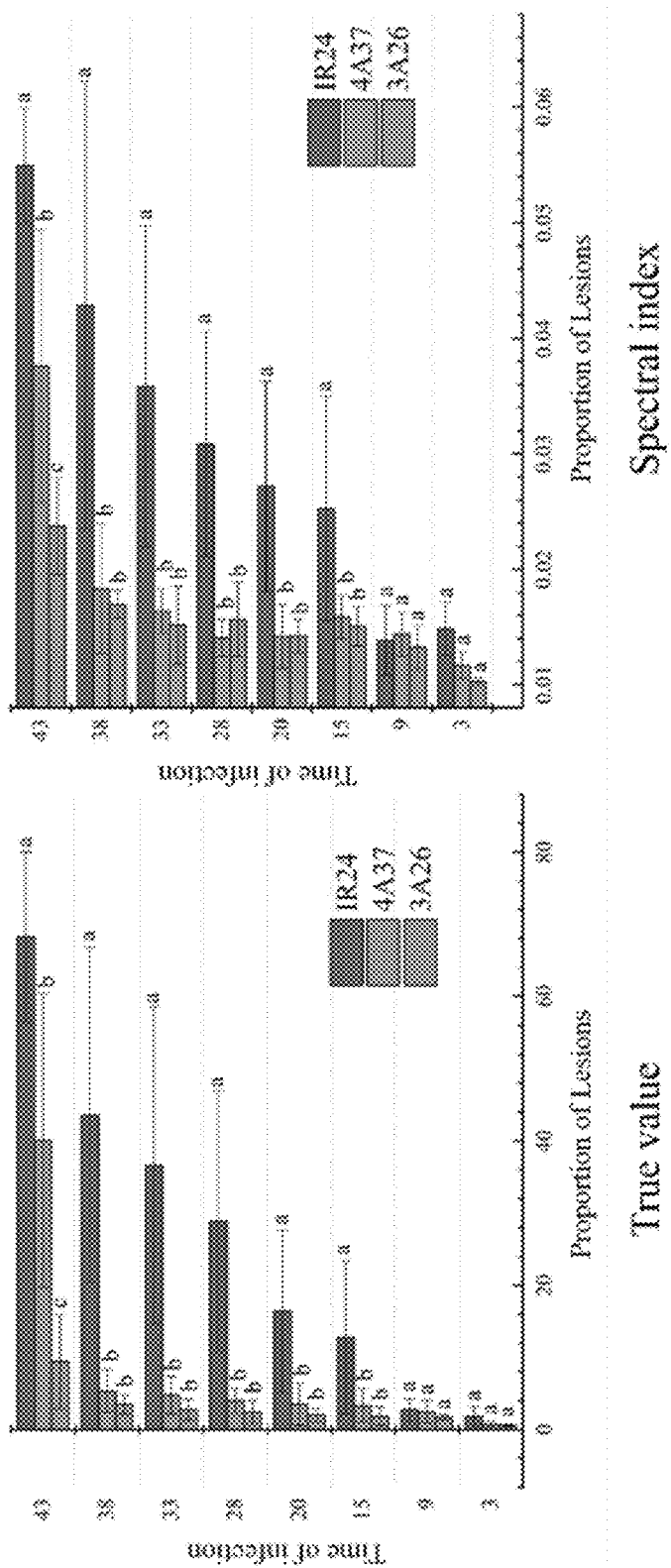
FIG. 6 is an identification diagram of the spectral indexes of the present disclosure.

Pseudo RGB images of rice leaves with three default wavelengths (R channel, 656.03 nm, G channel, 550.71 nm, B channel, and 550.71 nm) and the pseudo-color spectral image calculated according to the spectral index $I_{LP}$ were drawn, as shown in FIG. 5. Compared with the original RGB image, the positions of the leaves with different infection degrees were highlighted in the visual image of the spectral index $I_{LP}$ extracted by the method, but the uninfected leaves did not have obvious prominent areas. By checking the value of an image chromaticity bar, it could be found that the larger the proportion of the lesions, the larger the correlation value. In FIG. 6, it could be found through single-factor variance analysis that the spectral index $I_{LP}$ could distinguish resistant rice from non-resistant rice on the 15th day. On the 43rd day, the ability of the resistant varieties could be evaluated with $I_{LP}$.

Example III

Figure 7:
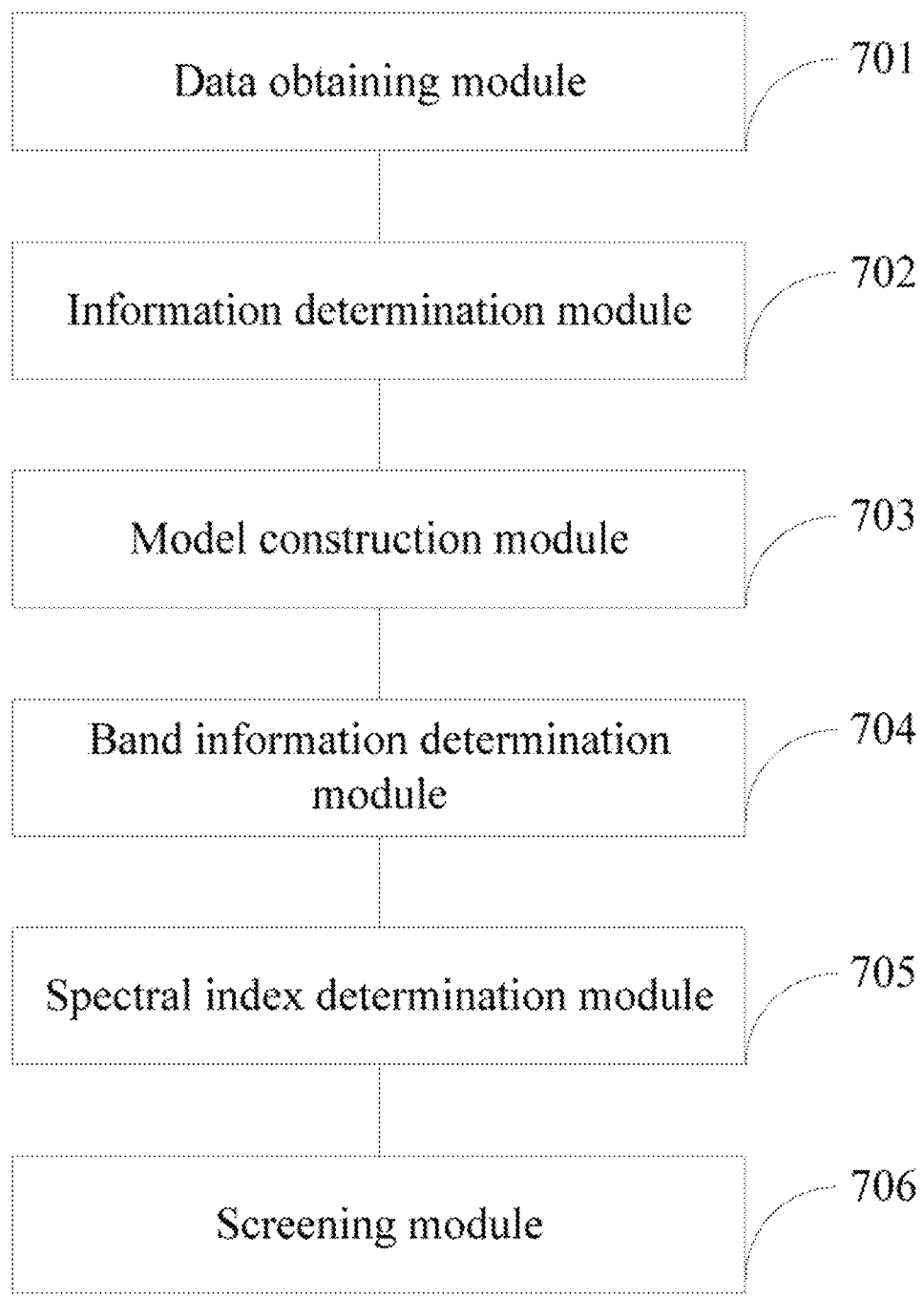
FIG. 7 is a schematic structural diagram of a system for screening spectral indexes of rice resistant to bacterial blight of the present disclosure.

As shown in FIG. 7, a system for screening spectral indexes of rice resistant to bacterial blight provided by the present example includes a data obtaining module, an information determination module, a model construction module, a band information determination module, a spectral index determination module, and a screening module.

The data obtaining module 701 is configured to obtain spectral data of a test sample. The test sample is rice leaves of different genotypes at different times of infection. The spectral data includes multiple spectral images.

The information determination module 702 is configured to process the spectral data by a threshold segmentation algorithm to obtain average spectral information of each spectral image and a proportion of lesions corresponding to each spectral image.

The model construction module 703 is configured to train a deep learning algorithm model based on a self-attention mechanism by using the average spectral information of each spectral image and the proportion of the lesions corresponding to each spectral image to construct a regression model for evaluating an area of the lesions.

The band information determination module 704 is configured to determine an optimal band combination and a weight value corresponding to each band in the optimal band combination based on the regression model for evaluating the area of the lesions.

The spectral index determination module 705 is configured to determine the spectral indexes based on the optimal band combination and the weight value corresponding to each band in the optimal band combination.

The screening module 706 is configured to identify differences between rice of different genotypes at different times of infection by using the spectral indexes, and screen rice varieties resistant to bacterial blight.

The information determination module 702 specifically includes a segmentation threshold determination unit, an area division unit, and an information determination unit.

The segmentation threshold determination unit is configured to determine a segmentation threshold. The segmentation threshold is a maximum difference value of spectral reflectance of a lesion area and a leaf area at a wavelength of 778.68 nm.

The area division unit is configured to process the spectral data by using the segmentation threshold to obtain the lesion area and the leaf area of each spectral image.

The information determination unit is configured to respectively calculate the number of pixels in the lesion area and the number of pixels in the leaf area in each spectral image to obtain the average spectral information of each spectral image and the proportion of the lesions corresponding to each spectral image.

The band information determination module 704 specifically includes a self-attention feature extraction unit, an optimal band combination determination unit, and a weight value determination unit.

The self-attention feature extraction unit is configured to extract self-attention features based on the regression model for evaluating the area of the lesions.

The optimal band combination determination unit is configured to sort the self-attention features according to a rule from large to small, select bands of the first N self-attention feature pairs, and determine the optimal band combination based on the bands of the first N self-attention feature pairs.

The weight value determination unit is configured to determine the weight value corresponding to each band in the optimal band combination based on the regression model for evaluating the area of the lesions.

Compared with the prior art, the present disclosure has the following beneficial effects:

(1) The effect is excellent. The resistance of rice is quantified by the digital method, which is helpful to accelerate the breeding process. (2) The method is simple and saves the detection cost, and is suitable for high-throughput detection of rice resistance phenotypes.

The examples in this specification are described herein in a progressive manner. Each example focuses on the difference from other examples, and the same and similar parts between the examples may refer to each other. Since the system disclosed in the examples corresponds to the method disclosed in the examples, the description is relatively simple, and reference can be made to the method description.

Specific examples are used herein to explain the principles and implementations of the disclosure. The foregoing description of the examples is merely intended to help understand the method of the present disclosure and its core ideas; besides, various modifications may be made by those of ordinary skill in the art to specific implementations and the scope of application in accordance with the ideas of the present disclosure. In conclusion, the content of this specification shall not be construed as a limitation to the present disclosure.

What is claimed is:

1. A method for screening spectral indexes of rice resistant to bacterial blight, comprising:
   obtaining spectral data of a test sample, wherein the test sample is rice leaves of different genotypes at different times of infection, and the spectral data comprises multiple spectral images;
   processing the spectral data by a threshold segmentation algorithm to obtain average spectral information of each spectral image and a proportion of lesions corresponding to each spectral image;
   training a deep learning algorithm model based on a self-attention mechanism by using the average spectral information of each spectral image and the proportion of the lesions corresponding to each spectral image to construct a regression model for evaluating an area of the lesions;
   determining an optimal band combination and a weight value corresponding to each band in the optimal band combination based on the regression model for evaluating the area of the lesions; and
   determining the spectral indexes based on the optimal band combination and the weight value corresponding to each band in the optimal band combination.

2. The method for screening spectral indexes of rice resistant to bacterial blight according to claim 1, wherein a process of obtaining the spectral data of the test sample specifically comprises:
   arranging the rice leaves of different genotypes at different times of infection neatly on a black plate, and then placing the black plate on a conveyor belt; and
   photographing the rice leaves on the conveyor belt by a spectral imaging system to obtain the spectral data of the test sample.

3. The method for screening spectral indexes of rice resistant to bacterial blight according to claim 1, wherein a process of processing the spectral data by the threshold segmentation algorithm to obtain the average spectral information of each spectral image and the proportion of the lesions corresponding to each spectral image specifically comprises:
   determining a segmentation threshold;
   processing the spectral data by using the segmentation threshold to obtain a lesion area and a leaf area of each spectral image; and
   respectively calculating a number of pixels in the lesion area and a number of pixels in the leaf area in each spectral image to obtain the average spectral information of each spectral image and the proportion of the lesions corresponding to each spectral image.

4. The method for screening spectral indexes of rice resistant to bacterial blight according to claim 3, wherein the segmentation threshold is a maximum difference value of spectral reflectance of the lesion area and the leaf area at a wavelength of 778.68 nm.

5. The method for screening spectral indexes of rice resistant to bacterial blight according to claim 1, wherein a process of determining the optimal band combination and the weight value corresponding to each band in the optimal band combination based on the regression model for evaluating the area of the lesions specifically comprises:

extracting self-attention features based on the regression model for evaluating the area of the lesions;

sorting the self-attention features according to a rule from large to small, selecting bands of the first N self-attention feature pairs, and determining the optimal band combination based on the bands of the first N self-attention feature pairs; and determining the weight value corresponding to each band in the optimal band combination based on the regression model for evaluating the area of the lesions.

6. The method for screening spectral indexes of rice resistant to bacterial blight according to claim 1, further comprising:

identifying differences between rice of different genotypes at different times of infection by using the spectral indexes, and screening rice varieties resistant to bacterial blight.

\* \* \* \* \*